(12) United States Patent
Shin et al.

(10) Patent No.: US 8,491,977 B2
(45) Date of Patent: Jul. 23, 2013

(54) OXYGEN BARRIER FILM AND CONTAINER COMPRISING ETHYLENE-ACRYLATE COPOLYMER

(75) Inventors: Bae-kun Shin, Incheon (KR); Ki-soo Lee, Daejeon (KR); Byoung-ho Jeon, Daejeon (KR); Yoo-young Jung, Gyeonggi-do (KR); Kyung-seop Noh, Daejeon (KR); Ki-su Ro, Daejeon (KR)

(73) Assignee: LG Chem, Ltd. (KR)

( * ) Notice: Subject to any disclaimer, the term of this patent is extended or adjusted under 35 U.S.C. 154(b) by 21 days.

(21) Appl. No.: 12/445,625

(22) PCT Filed: Oct. 18, 2007

(86) PCT No.: PCT/KR2007/005101
§ 371 (c)(1),
(2), (4) Date: Sep. 8, 2010

(87) PCT Pub. No.: WO2008/048052
PCT Pub. Date: Apr. 24, 2008

(65) Prior Publication Data
US 2010/0323143 A1    Dec. 23, 2010

(30) Foreign Application Priority Data

Oct. 18, 2006 (KR) .................. 10-2006-0101594
Sep. 3, 2007 (KR) .................. 10-2007-0089058

(51) Int. Cl.
*C08F 4/06* (2006.01)
(52) U.S. Cl.
USPC .......... 428/34.9; 428/34.8; 428/412; 428/516
(58) Field of Classification Search
USPC ................. 428/34.9, 34.8, 412, 516
See application file for complete search history.

(56) References Cited

U.S. PATENT DOCUMENTS

| | | | |
|---|---|---|---|
| 4,971,864 A | 11/1990 | McCord | |
| 5,310,788 A | 5/1994 | Moriyama et al. | |
| 5,356,990 A | 10/1994 | Pucci | |
| 5,660,761 A * | 8/1997 | Katsumoto et al. | 252/188.28 |
| 2005/0020775 A1 * | 1/2005 | Wu et al. | 525/191 |
| 2005/0255263 A1 * | 11/2005 | Lee et al. | 428/34.8 |

FOREIGN PATENT DOCUMENTS

| | | |
|---|---|---|
| EP | 0015556 | 9/1980 |
| EP | 0210725 | 2/1987 |
| JP | 5-032834 | 2/1993 |
| JP | 6-336543 | 12/1994 |
| JP | 10052899 | 2/1998 |
| JP | 2002226612 | 8/2002 |
| JP | 2004-002617 A | 1/2004 |
| JP | 2004-217792 * | 5/2004 |
| KR | 1019960001657 | 1/1996 |
| WO | 2007105896 | 9/2007 |

OTHER PUBLICATIONS

International Search Report, PCT/KR2007/005101.
"EMAC® and EBAC® Acrylate Resins", Product Specification Sheet, Westlake Chemical, 2012.

* cited by examiner

*Primary Examiner* — Ellen S Raudenbush
(74) *Attorney, Agent, or Firm* — Lerner, David, Littenberg, Krumholz & Mentlik, LLP

(57) ABSTRACT

The present invention relates to an oxygen barrier film and container comprising ethylene-acrylate copolymer, more precisely an oxygen barrier film and container comprising ethylene-acrylate based copolymer composed of 10-50 mol % of ethylene monomer and 50-90 mol % of acrylate based monomer and having the weight average molecular weight of at least 30,000 g/m. The present invention provides an oxygen barrier film and container having excellent mechanical properties including flexibility, stretchability, glass transition temperature, anti-absorptiveness and Rockwell hardness and other characteristics such as oxygen barrier property and transparency as well.

9 Claims, No Drawings

OXYGEN BARRIER FILM AND CONTAINER COMPRISING ETHYLENE-ACRYLATE COPOLYMER

CROSS REFERENCE TO RELATED APPLICATIONS

The present application is a national phase entry under 35 U.S.C. §371 of International Application No. PCT/KR2007/005101, filed Oct. 18, 2007, published in English, which claims the benefit of Korean Patent Application Nos. 10-2006-0101594, filed Oct. 18, 2006 and 10-2007-0089058, filed Sep. 3, 2007. The disclosures of said applications are incorporated by reference herein.

TECHNICAL FIELD

The present invention relates to an oxygen barrier film and a container comprising ethylene-acrylate copolymer, more precisely an oxygen barrier film and container having excellent mechanical properties such as flexibility, stretchability, glass transition temperature, anti-absorptiveness and Rockwell hardness in addition to excellent oxygen barrier property and transparency.

BACKGROUND ART

In general, polyolefin based resins such as polyethylene (PE) and polypropylene (PP) have excellent formability and mechanical properties as well as moisture barrier property, so that these resins have been widely applied in various fields. However, the polyolefin based resin has been avoided in food packing because of its high gas permeability particularly oxygen permeability. To overcome this disadvantage, there was an attempt to increase oxygen barrier property by compounding a nano complex to the polyolefin based resin. However, the attempt did not succeed in improving barrier property and even reduced mechanical properties. Thus, to be used for the food packing film, sheet and container, the polyolefin based resin is produced as a multilayer film by co-extrusion or lamination with ethylene-vinylalcohol copolymer (EVOH), nylon, and polyvinylidenchloride which have excellent oxygen barrier property.

The ethylene-vinylalcohol copolymer is a polymer material having excellent gas barrier property and transparency, so it has been used for packing for food or chemical products. However, the ethylene-vinylalcohol copolymer is limited in use because of high price and comparatively low mechanical properties such as flexibility and stretchability.

To overcome the poor oxygen barrier property of the polyolefin based resin and the poor flexibility and stretchability of the ethylene-vinylalcohol copolymer, the blending of the polyolefin based resin and the ethylene-vinylalcohol copolymer was tried. However, because of the unsatisfactory compatibility between the two, they only produce an irregular mixture which reduces the mechanical properties of the film or sheet products. Therefore, it is an important task to increase regularity of the mixture by selecting an appropriate compatibilizer for the blending.

European Patent No. 0,015,556 (publicized on Sep. 17, 1980) and No. 0,210,725 (publicized on Feb. 4, 1987), and U.S. Pat. No. 4,971,864 (registered on Nov. 20, 1990) describe that a film with improved oxygen barrier property and mechanical properties can be prepared by increasing regularity of the mixture of polyolefin based resin and ethylene-vinylalcohol copolymer by using a compatibilizer which is produced by graft-polymerization of a compound having a polar group with polyethylene. U.S. Pat. No. 5,310,788 describes a method to improve stretchability and flexibility of the mixture of polyolefin based resin and ethylene-vinylalcohol copolymer by using the reactant resulted from the reaction of polyamide (or polyamide oligomer) and polyolefin prepared by graft-polymerization of a compound having a polar group with polyethylene as a compatibilizer.

However, films prepared by the above methods were confirmed to have low oxygen barrier property and poor melting formability because of the large amount of a compatibilizer added to improve compatibility, and if the compatibilizer had been added by a small amount, the transparency and other mechanical properties of the film product would have been in question.

U.S. Pat. No. 5,356,990 (registered on Oct. 18, 1994) describes a method in which ethylene-vinylalcohol copolymer (EVOH) is melted first and then ethylene copolymer is added to improve mechanical properties and product appearance. However, to execute this method, a specially designed extruder or molting apparatus is required.

Korean Patent Application No. 1996-001657 describes a multilayer film prepared by the steps of adding a partially saponificated resin of the ethylene-vinylacetate copolymer, as a compatibilizer, to polyolefin based resin and ethylene-vinylalcohol copolymer respectively; and coating the both sides of the ethylene-vinylalcohol copolymer film with the polyolefin based resin. However, according to this method, the compatibility between the polyolefin based resin and the ethylene-vinylalcohol copolymer is still limited and the production procedure of the multilayer film is troublesome.

It has also been discussed the direct insertion of a polar group to polyolefin based resin in order to improve regularity of the oxygen barrier film. But the conventional methods such as high-temperature high-pressure method and catalytic method have problems of difficulty in production process and low introduction of the polar group.

Therefore, it is required to develop a novel oxygen barrier film and container having excellent mechanical properties and other characteristics such as transparency and oxygen barrier property from the polyolefin resin which has no problem of irregularity and enough polar group introduced.

DISCLOSURE OF INVENTION

Technical Problem

It is an object of the present invention, to overcome the problems of the conventional methods, to provide an oxygen barrier film and container having not only excellent mechanical properties but also excellent transparency and oxygen barrier property without causing irregularity inside of the resin.

Technical Solution

The above object of the present invention can be achieved by the following embodiments of the present invention.

The present invention is described in detail hereinafter.

To achieve the above object, the present invention provides an oxygen barrier film and container comprising ethylene-acrylate copolymer composed of 10-50 mol % of ethylene monomer and 50-90 mol % of acrylate monomer and having the weight average molecular weight of at least 30,000 g/mol.

The present inventors tried to achieve the above object and completed this invention by preparing a film and container having excellent transparency and oxygen barrier property as well as high glass transition temperature and Rockwell hardness by using a copolymer with a novel composition unlike the conventional ethylene-vinylalcohol copolymer (EVOH) which has been used as a main component in conventional methods.

The oxygen barrier film and container of the present invention characteristically comprise the ethylene-acrylate based copolymer composed of 10-50 mol % of ethylene monomer and 50-90 mol % of acrylate based monomer and having the weight average molecular weight of at least 30,000 g/mol.

The ethylene-acrylate based copolymer is prepared by polymerization of ethylene monomer and acrylate based monomer in the presence of metal oxide or Lewis acid by using a radical polymerization initiator.

The preferable content of the ethylene monomer is 10-50 mol %, and 15-40 mol % is more preferred. If the ethylene monomer content is less than 10 mol %, the final product might have unsatisfactory flexibility and stretchability, resulting in an inappropriate product as a film. On the other hand, if the ethylene monomer content is more than 50 mol %, it will favor mechanical properties but not transparency and ethylene reactivity that might be significantly reduced compared with acrylate reactivity, suggesting that it is technically not possible to execute. Thus, the ethylene monomer content of 15-40 mol % is optimum content to embody the technique and thus to prepare a film and container with improved mechanical strength.

The acrylate based monomer can be alkyl acrylate, alkyl methacrylate or their mixture. The alkyl acrylate or the alkyl methacrylate can be acrylic acid or methacrylic acid ester of alcohol having the carbon number of straight or branched chain of 1-12, and more preferably acrylic acid or methacrylic acid ester of alcohol having the carbon number of straight or branched chain of 1-8, and most preferably methyl(metha)acrylate, ethyl(metha)acrylate, n-butyl(metha)acrylate, iso-butyl(metha)acrylate, t-butyl(metha)acrylate, n-hexyl(metha)acrylate, 2-ethylbutyl(metha)acrylate, 2-ethylhexyl(metha)acrylate or acrylic acid ester of neo-isomer of alcohol having the carbon number of 5-12.

The acrylate based monomer content is a very important factor determining oxygen barrier property and transparency. So, ethylene-acrylate based copolymer with excellent transparency, oxygen barrier property and other mechanical properties can be prepared by regulating the acrylate based monomer content along with the ethylene monomer content affecting mechanical properties. The preferable acrylate based monomer content for the oxygen barrier film and container of the invention is 50-90 mol % and more preferable content is 60-85 mol %.

The ethylene monomer and acrylate based monomer can additionally include the third monomer. The third monomer herein is selected from the group consisting of vinyl ester such as vinyl acetate and monomers such as partial ester of acrylic acid, methacrylic acid or maleic acid and carbon monoxide. The preferable content of the third monomer is 5-80 weight part for 100 weight part of the mixture of ethylene monomer and acrylate based monomer.

The molecular weight of the ethylene-acrylate based copolymer is preferably at least 30,000 g/mol (weight average molecular weight) and more preferably at least 70,000 g/mol, and the highest limit is not set but is preferably up to 300,000 g/mol considering the conventional techniques. The weight average molecular weight of the ethylene-acrylate based copolymer under 30,000 g/mol results in the decrease of mechanical strength of the film, while the weight average molecular weight over 70,000 g/mol results in the increase of mechanical strength including tensile strength.

The oxygen barrier film is the general term for the thin membrane film, which includes sheet and wrap, etc. The preferable thickness of the oxygen barrier film is 5-1000 μm.

The oxygen barrier container herein indicates the container that is made from plastic, which is exemplified by a food container, a packing container and a cosmetic container. This container can also be used as a container for a heating cabinet owing to its high glass transition temperature and low moisture absorption rate.

The metal oxide can be alkaline earth metal, transition metal, oxides of 13-group and 14-group metals, etc, which is characteristically re-used for polymerization because it can be physically recovered. The preferably content of the metal oxide in 1 mol of acrylate based monomer is 0.1-10 mol and more preferable content is 0.5-3 mol.

The Lewis acid can be metal salt, preferably metal halide, more preferably metal chloride and most preferably aluminum chloride(III), zinc chloride, iron chloride(II) or iron chloride(III), but not always limited thereto. The preferable content of the Lewis acid in 1 mol of the acrylate based monomer is 0.01-1 mol.

The addition of the metal oxide or the Lewis acid can overcome the problems of the conventional high temperature high pressure method and catalytic method such as difficulty in production procedure and limited addition of polar group.

Any polymerization initiator known to those in the art can be used but peroxide or azo compound initiator is preferred and azo compound initiator is more preferred. The preferable content of the polymerization initiator in 1 mol of the acryl based comonomer is 0.001-1.0 mol and more preferable content is 0.01-0.1 mol.

The polymerization of the ethylene-acrylate based monomers can be performed in the presence of a solvent and at this time a conventional solvent accepted by those in the art can be used which would be preferably one or more solvents selected from the group consisting of toluene, chlorobenzene, n-hexane, n-heptane, tetrahydrofuran, chloroform and methylenechloride. The polymerization solvent can be added by 0.5-5.0, preferably 1.5-3.5 part for the total volume of the acrylate based monomer.

It is preferred to perform the polymerization of the ethylene monomer and acrylate based monomer at 30-150° C. under the normal pressure 200 ap, and more preferably performed at 50-120° C. under 5-50 ap.

Unlike the conventional method requiring high temperature and high pressure, the preparing method of the ethylene-acrylate based copolymer of the invention asks moderate reaction conditions such as temperature up to 100° C. and pressure up to 200 ap, suggesting that production procedure is simple and the regulation of the copolymer properties is easy. The ethylene-acrylate based copolymer prepared by the method of the invention is characteristically a random copolymer of the ethylene monomer and the acrylate based monomer that has significantly high polar group content, compared with the product of the conventional method, so that crystallization of ethylene is not induced, suggesting that it can be used as an optical material since it still maintains transparency after being processed into other products.

BEST MODE FOR CARRYING OUT THE INVENTION

Practical and presently preferred embodiments of the present invention are illustrative as shown in the following Examples.

However, it will be appreciated that those skilled in the art, on consideration of this disclosure, may make modifications and improvements within the spirit and scope of the present invention.

EXAMPLES

Examples 1-11 and Comparative Examples 1-4

A 125 ml high pressure reactor was made vacuous, which was then filled with nitrogen. 30 ml of toluene was added thereto. The reactor was put in a proper oven, to which aluminum chloride (III) was added by the amount indicated in Table 1. 6 ml of MMA (methyl methacrylate) or MA (methacrylate) was added to the reactor, which stood for 30 minutes until the reaction temperature was stabilized. AIBN (Azobisisobutyronitril) was dissolved in 5 ml of chlorobenzene at the concentration as indicated in Table 1, which was injected into the reactor. The reactor was filled with ethylene by 35 bar and the reaction temperature was raised to 70° C., followed by polymerization for 2 hours. Upon completion of the polymerization, the reaction temperature was reduced to room temperature, to which ethanol was added to precipitate the produced polymer as solid form (when metal oxide such as $Al_2O_3$ was added instead of the above aluminum chloride(III), filtering and recovering was required before ethanol injection). The solid substance was precipitated and the supernatant was eliminated. Ethanol was added thereto to wash the solid substance. The supernatant was eliminated again and water was added to the remaining solid substance, followed by stirring. The mixture was filtered to collect a polymer only. The resultant copolymer was dried in a 60° C. vacuum oven for one day.

The reaction conditions and results of examples 1-11 and comparative examples 1-4 are shown in Table 1.

Comparative Example 5

An experiment was performed with ethylene-vinylalcohol copolymer (EVOH, AT4403, Nippon Goshei) comprising 44 mol % of ethylene and having the weight average molecular weight of 100,000 g/mol and density of 1.14 g/cm$^2$, which is now on market as a material for containers for food and food packing and cosmetics, etc.

Experimental Example 1

Glass transition temperature—Copolymers obtained from examples 6-7 and comparative example 5 were tested for glass transition temperature by DSC Q100, TA Instrument at 20-150° C. and the results are shown in Table 2.

Moisture absorption rate—Copolymers obtained from examples 1, 2, 11, 12 and comparative example 5 were processed to disks (50 mm in diameter×3 mm in thickness), followed by drying for 24 hours at 50° C. oven. The disks were cooled down at room temperature in a desiccator and weight (m1) of each risk was measured. The dried disks were ripped in 23° C. distilled water for 24 hours and then taken out. Moisture on the surface was eliminated and weight (m2) of each risk was measured again. The moisture absorption rate was calculated by the following mathematical formula I and the results are shown in Table 3.

Mathfigure 1

$$\text{Moisture absorption rate (\%)} = (m2-m1)/m1 \times 100 \quad [\text{Math.1}]$$

Rockwell hardness—Copolymers obtained from examples 2, 3, 4 and comparative example 5 were prepared as a rectangular sample of 30 mm×3 mm, followed by measuring Rockwell hardness by Wilson Rockwell series 2000, Instron. The results are shown in Table 4.

TABLE 2

| | Glass transition temperature (° C.) |
|---|---|
| Example 6 | 98.0 |
| Example 7 | 82.1 |
| Comparative Example 5 (EVOH) | 55.5 |

TABLE 1

| | Monomer | MMA:AlCl3 | AIBN:MMA | Ethylene content (mol %) | Molecular weight (g/mol) |
|---|---|---|---|---|---|
| Example 1 | MMA | 1:0.700 | 1.0:1000 | 25.3 | 153,000 |
| Example 2 | MMA | 1:0.500 | 1.0:1000 | 19.4 | 161,000 |
| Example 3 | MMA | 1:0.300 | 1.0:1000 | 12.3 | 149,000 |
| Example 4 | MMA | 1:0.300 | 1.5:1000 | 12.5 | 96,600 |
| Example 5 | MMA | 1:0.300 | 2.0:1000 | 11.6 | 61,000 |
| Example 6 | MMA | 1:0.500 | 1.5:1000 | 20.0 | 98,000 |
| Example 7 | MA | 1:0.700 | 1.5:1000 | 34.5 | 129,000 |
| Example 8 | MA | 1:0.350 | 1.0:1000 | 21.4 | 135,000 |
| Example 9 | MA | 1:0.300 | 1.0:1000 | 17.1 | 130,000 |
| Example 10 | MA | 1:0.300 | 2.0:1000 | 17.9 | 61,000 |
| Example 11 | MMA | 1:0.500 | 2.0:1000 | 20.0 | 89,000 |
| Comparative Example 1 | MMA | 1:0.150 | 1.5:1000 | 5.9 | 97,000 |
| Comparative Example 2 | MMA | 1:0.300 | 10:1000 | 12.7 | 15,000 |
| Comparative Example 3 | MA | 1:0.100 | 1.5:1000 | 7.4 | 114,000 |
| Comparative Example 4 | MA | 1:0.300 | 10:1000 | 18.4 | 18000 |

As shown in Table 2, the ethylene-acrylate copolymer of the present invention had significantly high glass transition temperature, compared with the conventional ethylene-vinylalcohol copolymer (comparative example 5).

TABLE 3

| | Moisture absorption rate (%) |
|---|---|
| Example 1 | 0.29 |
| Example 2 | 0.30 |
| Example 9 | 0.35 |
| Example 10 | 0.37 |
| Comparative Example 5 (EVOH) | 5.09 |

As shown in Table 3, the ethylene-acrylate copolymer of the present invention hardly absorbed moisture, compared with the conventional ethylene-vinylalcohol copolymer (comparative example 5).

TABLE 4

| | Rockwell hardness (R scale) |
|---|---|
| Example 2 | 113.9 |
| Example 3 | 119.6 |
| Example 4 | 118.4 |
| Comparative Example 5 (EVOH) | 90.3 |

As shown in Table 4, the ethylene-acrylate copolymer of the present invention had excellent hardness, compared with the ethylene-vinylalcohol copolymer (comparative example 5).

Example 12

10 g of the ethylene-methylmethacrylate copolymer powder prepared in example 1 was mixed with 20 g of tetrahydrofuran and this mixture was evenly, linearly distributed on a glass plate. The distance between the blade of the regulator and the lower part was set as 150 μm and the mixture evenly regulated on the glass plate was dried in a hood. The dried film was taken off from the glass plate and dried in a 60° C. oven for 24 hours to give a 25 μm thick film.

Example 13

An experiment was performed by the same manner as described in example 11 except that the ethylene-methylmethacrylate copolymer powder prepared in example 2 was used to give a 23 μm thick film.

Example 14

An experiment was performed by the same manner as described in example 11 except that the ethylene-methylmethacrylate copolymer powder prepared in example 3 was used to give a 12 μm thick film.

Example 15

An experiment was performed by the same manner as described in example 11 except that the ethylene-methylmethacrylate copolymer powder prepared in example 4 was used to give a 20 μm thick film.

Example 16

An experiment was performed by the same manner as described in example 11 except that the ethylene-methylmethacrylate copolymer powder prepared in example 5 was used to give a 20 μm thick film.

Example 17

An experiment was performed by the same manner as described in example 11 except that the ethylene-methylacrylate copolymer powder prepared in example 7 was used to give a 24 μm thick film.

Example 18

An experiment was performed by the same manner as described in example 11 except that the ethylene-methylacrylate copolymer powder prepared in example 8 was used to give a 25 μm thick film.

Example 19

An experiment was performed by the same manner as described in example 11 except that the ethylene-methylacrylate copolymer powder prepared in example 9 was used to give a 25 μm thick film.

Example 20

An experiment was performed by the same manner as described in example 11 except that the ethylene-methylacrylate copolymer powder prepared in example 10 was used to give a 25 μm thick film.

Example 21

An experiment was performed by the same manner as described in example 12 except that the ethylene-methylmethacrylate copolymer powder prepared in example 11 was used and the distance between the blade of regulator and the lower part was adjusted to 100 μm to give a 15 μm thick film.

Example 22

An experiment was performed by the same manner as described in example 21 except that the distance between the blade of regulator and the lower part was adjusted to 200 μm to give a 30 μm thick film.

Example 23

An experiment was performed by the same manner as described in example 21 except that the distance between the blade of regulator and the lower part was adjusted to 450 μm to give a 70 μm thick film.

Example 24

An experiment was performed by the same manner as described in example 21 except that the distance between the blade of regulator and the lower part was adjusted to 2,000 μm to give a 400 μm thick film.

Example 25

An experiment was performed by the same manner as described in example 21 except that the distance between the blade of regulator and the lower part was adjusted to 6,000 μm to give a 1,200 μm thick film.

Comparative Example 7

An experiment was performed by the same manner as described in example 12, except that the ethylene-methylmethacrylate copolymer powder prepared in comparative example 1 was used. As a result, the production of film was failed because of cracks.

Comparative Example 8

An experiment was performed by the same manner as described in example 12, except that the ethylene-methylmethacrylate copolymer powder prepared in comparative example 2 was used to give a 20 μm thick film.

Comparative Example 9

An experiment was performed by the same manner as described in example 12, except that the ethylene-methylmethacrylate copolymer powder prepared in example 6 was used to give a 4 μm thick film.

Comparative Example 10

An experiment was performed by the same manner as described in example 12, except that the ethylene-methylmethacrylate copolymer powder prepared in comparative example 3 was used. As a result, the production of film was failed because of cracks.

Comparative Example 11

An experiment was performed by the same manner as described in example 12, except that the ethylene-methylacrylate copolymer powder prepared in comparative example 4 was used to give a 24 μm thick film.

Comparative Example 12

An experiment was performed by the same manner as described in example 12 except the ethylene-vinylalcohol copolymer prepared in comparative example 5 was used and DMSO (dimethyl sulfoxide) was used instead of tetrahydrofuan to give a 20 μm thick film.

Experimental Example 2

Oxygen permeability The ethylene-methylmethacrylate copolymer films (PEMMA), the ethylene-methacrylate copolymer films (PEMA) and the ethylene-vinylalcohol copolymer films (EVOH) prepared in examples 12-20 and comparative examples 7-12 were prepared as 10 cm×10 cm samples, which were tested for oxygen permeability under the relative humidity of 0%, supplied oxygen purity of 99.9% and supplied pressure of 0.5 bar by Mocon Oxtran for at least 12 hours at one hour intervals. The results are shown in Table 3.

TABLE 5

|  |  | Ethylene content (mol %) | Molecular weight (g/mol) | Thickness (μm) | Oxygen permeability (cc · 30 um/m² · day · atm) |
|---|---|---|---|---|---|
| Example 12 | PEMMA | 25.3 | 153,000 | 25 | 0.1082 |
| Example 13 | PEMMA | 19.4 | 161,000 | 23 | 0.2833 |
| Example 14 | PEMMA | 12.3 | 149,000 | 12 | 0.3080 |
| Example 15 | PEMMA | 12.5 | 96,600 | 20 | 0.2605 |
| Example 16 | PEMMA | 11.6 | 61,000 | 20 | 0.4636 |
| Example 17 | PEMA | 34.5 | 129,000 | 24 | 0.2047 |
| Example 18 | PEMA | 21.4 | 135,000 | 25 | 0.2933 |

TABLE 5-continued

|  |  | Ethylene content (mol %) | Molecular weight (g/mol) | Thickness (μm) | Oxygen permeability (cc · 30 um/m² · day · atm) |
|---|---|---|---|---|---|
| Example 19 | PEMA | 17.1 | 130,000 | 25 | 0.3173 |
| Example 20 | PEMA | 17.9 | 61,000 | 25 | 0.4234 |
| Comparative Example 7 | PEMMA | 5.9 | 97,000 | Failed |  |
| Comparative Example 8 | PEMMA | 12.7 | 15,000 | 20 | 0.9612 |
| Comparative Example 9 | PEMMA | 20.0 | 98,000 | 4 | 10.2341 |
| Comparative Example 10 | PEMA | 7.4 | 114,000 | Failed |  |
| Comparative Example 11 | PEMA | 18.4 | 18,000 | 24 | 0.9700 |
| Comparative Example 12 | EVOH | 44.0 | 100,000 | 20 | 0.5921 |

As shown in Table 5, the oxygen barrier films of the invention (examples 12-20) had very low oxygen permeability of 0.1-0.4. In particular, the film with the molecular weight of at least 70,000 g/mol had lower oxygen permeability which was 0.1-0.3, suggesting that those films had excellent oxygen barrier property.

When the ethylene content was less than 10 mol %, for example in comparative examples 7 and 10, the production of film was failed. When the weight average molecular weight of the film was less than 30,000 g/mol (comparative examples 8 and 11) and when the film was too thin (4 μm) (comparative example 9), oxygen permeability was increased high.

The conventional ethylene-vinylalcohol copolymer (EVOH) film (comparative example 12) had greater oxygen barrier property than the films of comparative examples 7 and 11, which was though lower than the films of the invention (examples 12-20).

Experimental Example 3

Transparency according to the film thickness—The ethylene-methylmethacrylate copolymer films prepared in examples 21-25 were prepared as 2 cm×2 cm samples. Then, transparency of the sample was measured by UV light meter at 200~1000 nm. The results are shown in Table 6.

TABLE 6

|  | Film thickness (μm) | Transparency (%) |
|---|---|---|
| Example 21 | 15 | 92.5 |
| Example 22 | 30 | 91.4 |
| Example 23 | 70 | 91.2 |
| Example 24 | 400 | 80.4 |
| Example 25 | 1,200 | 75.3 |

As shown in Table 6, transparency of the oxygen barrier film of the present invention was not much reduced until the thickness was up to 1,200 μm, suggesting that this film is appropriate as an industrial transparent material as long as it is in the thickness range of 5-1000 μm.

INDUSTRIAL APPLICABILITY

The oxygen barrier film of the present invention which is prepared from ethylene-acrylate based copolymer can be used in a variety of industrial fields owing to its excellent mechanical properties as a film and excellent oxygen barrier property and transparency with overcoming the irregularity problem of the conventional resin.

And, the oxygen barrier container of the present invention prepared from the ethylene-acrylate based copolymer has high glass transition temperature, low moisture absorption rate and excellent Rockwell hardness, so that the container of the invention can be used as a food container, a packing container, a cosmetic container and a container for a heating cabinet.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. An oxygen barrier film comprising ethylene-acrylate based random copolymer composed of 20-34.5 mol % of ethylene monomer and 65.5-80 mol % of acrylate based monomer and having the weight average molecular weight of at least 70,000 g/mol,
   wherein the film:
   (a) has a thickness of 5-1,000 μm;
   (b) exhibits an oxygen permeability of 0.1-0.4 cc.30 um/m$^2$.day.atm; and
   the copolymer exhibits a glass transition temperature, Tg, of 82.1° C. to 98.0° C.

2. The oxygen barrier film according to claim 1, wherein the acrylate monomer is one or more monomers selected from the group consisting of alkyl acrylate and alkyl methacrylate.

3. The oxygen barrier film according to claim 1, wherein the acrylate based monomer is one or more monomers selected from the group consisting of acrylic acid and methacrylic acid ester of alcohol having the carbon number of straight or branched chain of 1-12.

4. The oxygen barrier film according to claim 1, wherein the acrylate based monomer is one or more monomers selected from the group consisting of methyl acrylate, ethyl acrylate, n-butyl acrylate, iso-butyl acrylate, t-butyl acrylate, n-hexyl acrylate, 2-ethylbutyl acrylate, 2-ethylhexyl acrylate and acrylic acid ester of neo-isomer of alcohol having the carbon number of 5-12.

5. An oxygen barrier container comprising ethylene-acrylate random copolymer composed of 20-34.5 mol % of ethylene monomer and 65.5-80 mol % of acrylate based monomer and having the weight average molecular weight of at least 70,000 g/m, wherein:
   (a) the container has oxygen permeability of 0.1-0.4 cc.30 um/m$^2$.day.atm; and
   (b) wherein the copolymer exhibits a glass transition temperature, Tg, of 82.1° C. to 98.0° C.

6. The oxygen barrier container according to claim 5, wherein the acrylate based monomer is one or more monomers selected from the group consisting of alkyl acrylate and alkyl methacrylate.

7. The oxygen barrier container according to claim 5, wherein the acrylate based monomer is one or more monomers selected from the group consisting of acrylic acid and methacrylic acid ester of alcohol having the carbon number of straight or branched chain of 1-12.

8. The oxygen barrier container according to claim 5, wherein the acrylate based monomer is one or more monomers selected from the group consisting of methyl acrylate, ethyl acrylate, n-butyl acrylate, iso-butyl acrylate, t-butyl acrylate, n-hexyl acrylate, 2-ethylbutyl acrylate, 2-ethylhexyl acrylate and acrylic acid ester of neo-isomer of alcohol having the carbon number of 5-12.

9. The oxygen barrier container according to claim 5, wherein the container is a food container, a packing container, a cosmetic container or a container for a heating cabinet.

* * * * *